United States Patent
Takano

(10) Patent No.: US 7,933,034 B2
(45) Date of Patent: Apr. 26, 2011

(54) IMAGE DATA PROCESSING CIRCUIT AND IMAGE FORMING APPARATUS HAVING THE SAME

(75) Inventor: Kuniyoshi Takano, Odawara (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1420 days.

(21) Appl. No.: 11/398,837

(22) Filed: Apr. 6, 2006

(65) Prior Publication Data

US 2007/0236752 A1    Oct. 11, 2007

(51) Int. Cl.
*G06F 3/12* (2006.01)

(52) U.S. Cl. ....... 358/1.15; 345/519; 347/115; 347/232; 358/500; 358/530; 382/162

(58) Field of Classification Search ................. 358/1.15, 358/448; 347/115, 117, 232, 237; 382/162
See application file for complete search history.

(56) References Cited

U.S. PATENT DOCUMENTS

| | | | | |
|---|---|---|---|---|
| 4,968,995 A | * | 11/1990 | Mizoguchi et al. | 347/186 |
| 5,909,235 A | * | 6/1999 | Folkins | 347/240 |
| 6,021,256 A | * | 2/2000 | Ng et al. | 358/1.9 |
| 6,038,607 A | * | 3/2000 | Hamilton et al. | 709/236 |
| 6,429,948 B1 | * | 8/2002 | Rumph et al. | 358/1.15 |
| 2005/0108446 A1 | * | 5/2005 | Inogai | 710/20 |

FOREIGN PATENT DOCUMENTS

| | | | |
|---|---|---|---|
| JP | 2004-127033 | | 4/2004 |
| JP | 2004274271 A | * | 9/2004 |

* cited by examiner

*Primary Examiner* — King Y Poon
*Assistant Examiner* — David S. Cammack
(74) *Attorney, Agent, or Firm* — Turocy & Watson, LLP

(57) ABSTRACT

To provide an image data processing circuit with high productivity and a color image forming apparatus using the same by enabling sharing of the image data processing circuit between a four-rotation machine and a quadruple tandem machine, and reduction of registers for four colors arranged for the four-rotation machine to a single register for one color. There is provided an image forming apparatus in which a first image processing unit out of first and second image processing units provided in an image data processing circuit executes a first image processing for an image read by a scanner unit, stores an image signal in a page memory, the second image processing unit reads the image signal from the page memory according to a synchronous signal generated in an engine unit to execute a second image processing, and the engine unit forms the image on the basis of the results therefrom.

3 Claims, 7 Drawing Sheets

IMAGE DATA PROCESSING CIRCUIT AND IMAGE FORMING APPARATUS HAVING THE SAME

BACKGROUND OF THE INVENTION

1. Field of the Invention

The present invention relates to an image data processing circuit and an image forming apparatus having the same and, more specifically, to an image data processing circuit that executes a first image processing for an image read by a scanner unit, stores an image signal thereof in a page memory, and reads the image signal from the page memory according to a synchronous signal generated in an engine unit to execute a second image processing, and a color image forming apparatus that executes an image formation in the engine unit using the result of process executed by the image data processing circuit.

2. Description of the Related Art

The color image forming apparatus (MFP) can be categorized roughly into a four-rotation machine and a quadruple tandem machine. In the four-rotation machine, in order to print in the color order (for example, in the order of Y→M→C→K), a single-color process is basically executed in a part from the page memory on of the path of scanner→page memory→printer (processing step), and hence a processing circuit for processing image data for a single-color printing must simply be provided. On the other hand, in the case of the quadruple tandem machine, since the YMCK colors are processed simultaneously even though the printing timing is different due to the positions of the drums, the processing circuits for four colors are necessary.

In the case of the quadruple tandem machine, registers for the respective colors that can cope with four-color simultaneous processing are provided as described above, while in the case of the four-rotation machines, since the time between colors (from a moment when a printing process in a specific printing color is ended to a moment when the process in the next color is started) is short, and hence rewriting of the registers (several tens thousands) by normal access of the CPU cannot be finished within the time between colors. Therefore, registers for four colors that are not used simultaneously are provided to be switched for use. As a document that discloses a technology which is similar to the one shown above, JP-A-2004-274271 is known. There is also JP-A-2004-127033 as another document that discloses a technology related thereto.

However, in the technology disclosed in the above-described documents, the scale of the circuit is increased when integrating the processing circuit, which may result in cost increase. Also, there is a problem such that since the processing circuit for the four-rotation machine and the processing circuit for the quadruple tandem machine cannot be shared, the number of products manufactured cannot be increased although the development cost and the number of management steps of large scale integration increase, whereby improvement of productivity is difficult.

SUMMARY OF THE INVENTION

The invention is intended to solve the problems described above, and an object of the invention is to provide an image data processing circuit with high productivity and a color image forming apparatus using the same by enabling sharing of the image data processing circuit between a four-rotation machine and of a quadruple tandem machine, and reduction of registers for four colors arranged for the four-rotation machine to a single register for one color.

In order to solve the above-described problems, an image forming apparatus according to the invention is an image forming apparatus in which a first image processing unit out of first and second image processing units provided in an image data processing circuit executes a first image processing for an image read by a scanner unit, stores an image signal in a page memory, the second image processing unit reads the image signal from the page memory according to a synchronous signal generated in an engine unit to execute a second image processing, and the engine unit forms the image on the basis of the results therefrom, including: a register value storing unit provided outside the image data processing circuit for storing a register value required for the image processing; a single-color register arranged in the second image processing unit; a direct access control circuit arranged in the image data processing circuit for enabling the CPU to rewrite the register value for the single-color register in the second image processing unit; a register rewriting circuit arranged in the image data processing circuit for enabling rewriting of the register value for the single-color register in the second image processing unit by the register value from the register value storing unit; and a switching circuit arranged in the image data processing circuit for allowing one of a CPU that goes through a direct access control circuit and a register rewriting circuit to access the single-color register in the second image processing unit for rewriting the register value as needed.

In this arrangement, the image processing circuit can be used for the four-rotation machine without problem and can be used commonly for the quadruple tandem machine, and integration is also possible. When being used for the quadruple tandem machine, the register value storing unit is not necessary.

In the invention, preferably, the image data processing circuit is configured as an integrated circuit.

In the invention, preferably, when rewriting the register value as needed by allowing one of the CPU that goes through the direct access control circuit and the register rewriting circuit to access a single-color register in the second image processing unit, the CPU rewrites the register value of the first color and the register rewriting circuit rewrites the register values of the colors from the second color on.

In the invention, preferably, the timing to rewrite the register value of the single-color register in the second image processing unit by the register value from the register value storing unit provided outside the second image processing unit is determined on the basis of a page synchronous signal supplied from the engine unit, a color information signal indicating a printing color, and a vertical scanning effective signal outputted from the second image processing unit.

In the invention, the timing of rewriting the register value of the single-color register in the second image processing unit by the register value from the register value storing unit provided outside the second image processing unit is determined by the CPU that gives printing instruction to the page memory and the engine unit.

The invention provides an image data processing circuit including: a register rewriting circuit to which a register storing unit can be connected; a single-color register in which the register value for image data processing can be stored; a switching circuit for switching the circuit according to a notification from the CPU indicating which one of the CPU and the register rewriting circuit can access the single-color register; and an image processing unit for applying image processing to the image data in the respective colors using the register value stored in the single-color register according to the image data of the respective colors and outputting the data to the engine unit as printing data, wherein the switching circuit enables access of the CPU to the single-color register so that the CPU can write a register value relating to a first color to be processed into the single-color register when the CPU receives setting of the operation of the four-rotation engine, enables the register rewriting circuit to rewrite the register value of the single-color register by the register value obtained from the register value storing unit via DMA according to the processing timing of the respective colors as regards colors from the second color on, and enables the CPU to access the single-color register so that the CPU can rewrite the register value of the single-color register by the register value corresponding to the color to be processed according to the processing timing of the respective color when the CPU receives setting of the operation of the quadruple tandem operation.

In the invention, preferably, the register rewriting control circuit, the single-color register, the switching circuit, and the image processing unit are configured as a single LSI.

In the image data processing circuit according to the invention, preferably, the timing to rewrite the register value of the single-color register by the register value from the register value storing unit is determined on the basis of the page synchronous signal supplied from the engine unit, the color information signal indicating the printing color, and the vertical scanning effective signal outputted from the image data processing circuit.

In the image data processing circuit according to the invention, preferably, the timing to rewrite the register value for single-color register by the register value from the register value storing unit is determined by the CPU that gives a printing instruction to the page memory and the engine unit.

DESCRIPTION OF THE EMBODIMENTS

Figure 1:
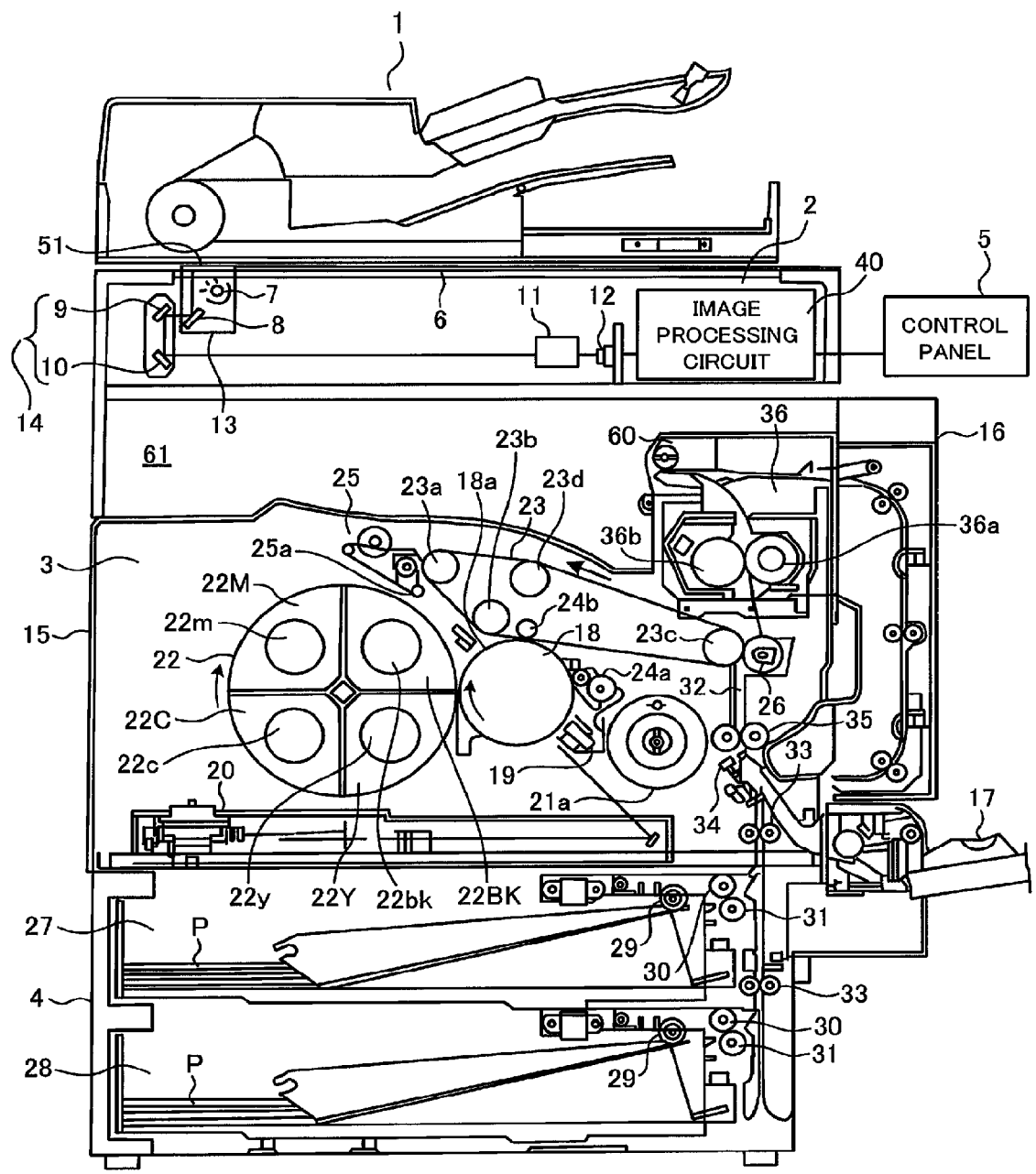
FIG. 1 is a cross-sectional view showing a structure of a color image forming apparatus according to the invention.

Referring now to the drawings, the embodiments of the invention will be described below.

First Embodiment

Referring now to the drawings, a first embodiment of the invention will be described. FIG. 1 is a block diagram showing the first embodiment of the image forming apparatus according to the invention. The image forming apparatus is, for example, a color PPC (four-rotation machine) and includes an automatic document feeder 1 (hereinafter referred to as ADF 1), a scanner unit 2 for reading the image, a process unit 3 for forming an output image, a paper feed unit 4, a control panel 5 and so on.

The scanner unit 2 illuminates a source document (reading object) fed from the ADF 1 or a reading object such as a source document preset on a document table with light from a light source, introduces reflected light from the reading object (hereinafter referred to as source document) to a line CCD sensor via optical members such as mirrors or lenses for photoelectric conversion and outputs the same to a process unit 3 or an external device, not shown, or to a network. In the scanner unit 2, the source document to be read is moved on a document table glass 6 by the ADF 1 at a certain speed or placed on the document table glass 6 with a front face down.

The source document is illuminated by a power source 7, and reflected light from the source document forms an image on the line CCD sensor 12 via respective mirrors 8-10 and a reducing lens 11. When reading the source document placed on the document table glass 6, a first carriage 13 composed of the light source 7 and the mirror 8 and a second carriage 14 composed of the respective mirrors 9, 10 are moved from the right to the left of the drawing with a drive motor, not shown. Accordingly, the source document is scanned by the illumination light from the light source 7 (vertical scanning direction).

The speed of movement of the first carriage 13 is double the speed of movement of the second carriage 14, so that the length of optical path from the source document to the line CCD sensor 12 is constantly the same. When the source document is carried by the ADF 1, the light illuminated from the light source 7 does not move and is scanned by moving the source document. The light received by the line CCD sensor 12 is amplified in an amplifier (AMP), and is converted into a digital signal by an A/D converter. The converted signal is subjected to a desired image process, and is outputted to the process unit 3.

The process unit 3 outputs an image on the basis of image data read from the source document by the scanner unit 2 or image data supplied from the external device, not shown, onto a paper (transfer medium) P. The paper feed unit 4 supplies the paper P to the process unit 3. The scanner unit 2, the process unit 3, and the paper feed unit 4 are stored in a housing 15. A double-sided paper feed unit 16 and a manual feed unit 17 are detachably attached to the right side of the housing 15. The double-sided paper feed unit 16 reverses the paper P on one side of which an image is formed by the process unit 3 and feeds the same again to the process unit 3. The manual feed unit 17 is used for feeding the paper P by manual insertion to the process unit 3.

The process unit 3 includes a photoreceptor drum (image carrying member) 18 extending in the front-rear direction (direction of a paper plane) of this device. A charging device 19, an exposure device 20, a revolver (developing unit) 22, an intermediate transfer belt (intermediate transfer member) 23 and a drum cleaner (cleaning device) 24a are provided along the direction of rotation of the photoreceptor drum 18 (in the direction indicated by an arrow in the drawing). The charging device 19 charges an outer peripheral surface (hereinafter referred to as drum surface) 18a of the photoreceptor drum 18 to a predetermined potential. The exposure device 20 is disposed at a position near a lower end of the process unit 3 and causes the drum surface 18a charged to a predetermined potential to be exposed to a laser beam for scanning to form an electrostatic latent image of the respective colors on the drum surface 18a.

The revolver 22 is rotatably provided in adjacent to the photoreceptor drum 18 on the left side thereof in the drawing. The revolver 22 includes a yellow developing machine (first developing machine) 22Y, a magenta developing machine (second developing machine) 22M, a cyan developing machine (third developing machine) 22C, and a black developing machine (fourth developing machine) 22BK. These developing machines 22Y, 22M, 22C and 22BK are aligned in the direction of rotation of the revolver 22, and are dismountably stored in the revolver 22. The developing machines 22Y, 22M, 22C and 22BK include toner cartridges 22y, 22m, 22c and 22bk in which developers in the respective colors are stored.

When forming the image, the revolver 22 is rotated in the clockwise so as to be selectively opposing the desired developing machines 22Y, 22M, 22C or 22BK to the drum surface 18a of the photoreceptor drum 18. In this manner, the yellow developing machine 22Y, the magenta developing machine 22M, the cyan developing machine 22C and the black developing machine 22BK integrated in the process unit 3 are arranged in the revolver 22.

The intermediate transfer belt 23 is arranged at a position that comes into contact with the photoreceptor drum 18 from above. The intermediate transfer belt 23 is wound around a drive roller 23a, a before-transfer roller 23b, a transfer opposing roller 23c and a tension roller 23d each having axis of rotation extending in the front-rear direction (the direction of the paper plane).

Provided inside the intermediate transfer belt 23 is a primary transfer roller 24b that presses the intermediate transfer belt 23 against the drum surface 18a at a predetermined pressure for transferring a developer image formed on the drum surface 18a to the intermediate transfer belt 23. Provided around the intermediate transfer belt 23 is a belt cleaner 25 for cleaning the intermediate transfer belt 23 and a secondary transfer roller 26 for transferring the developer image on the intermediate transfer belt 23 onto the paper P respectively so as to be capable of coming into and out of contact with the surface of the intermediate transfer belt 23.

The paper feed unit 4 includes two paper feed cassettes 27, 28. Provided on the right upper end in the drawing of the paper feed cassettes 27, 28 are pickup rollers 29 respectively for taking out uppermost papers P stored in the cassettes. At positions on the downstream side in the paper pickup direction by the pickup rollers 29 in adjacent thereto, there are provided feed rollers 30 and separation rollers 31 respectively in contact with each other. At a position on the right side in the drawing of the respective paper feed cassettes 27, 28 in adjacent thereto, there is provided a paper carrier path 32 that is extended toward a secondary transfer point where the intermediate transfer belt 23 and the secondary transfer roller 26 are in contact with each other.

In the paper carrier path 32, a plurality of carrier roller pairs 33 that rotate while supporting the paper P from both sides, an aligning sensor 34 that detects arrival of the paper P, an aligning roller pair 35 for feeding paper P to the secondary transfer point at a predetermined timing in sequence. In the paper carrier path 32 that extends upward through the second transfer point, a fixing device 36 for heating and pressurizing developer transferred on the paper P for fixing the same is provided. The fixing device 36 includes a heating roller 36a having a heater integrated therein and a pressurizing roller 36b disposed so as to press the paper P against the heating roller 36a.

The control panel 5 includes a copy start button, and a plurality of select switches for selecting a monochrome reading mode as a mode for reading the source document in a monochrome image, a color reading mode for reading the same in a color image, an automatic color select (ACS) mode for selecting and reading one or both of the monochrome image or the color image automatically, and a consecutive mode for reading a plurality of reading object consecutively.

Figure 2:
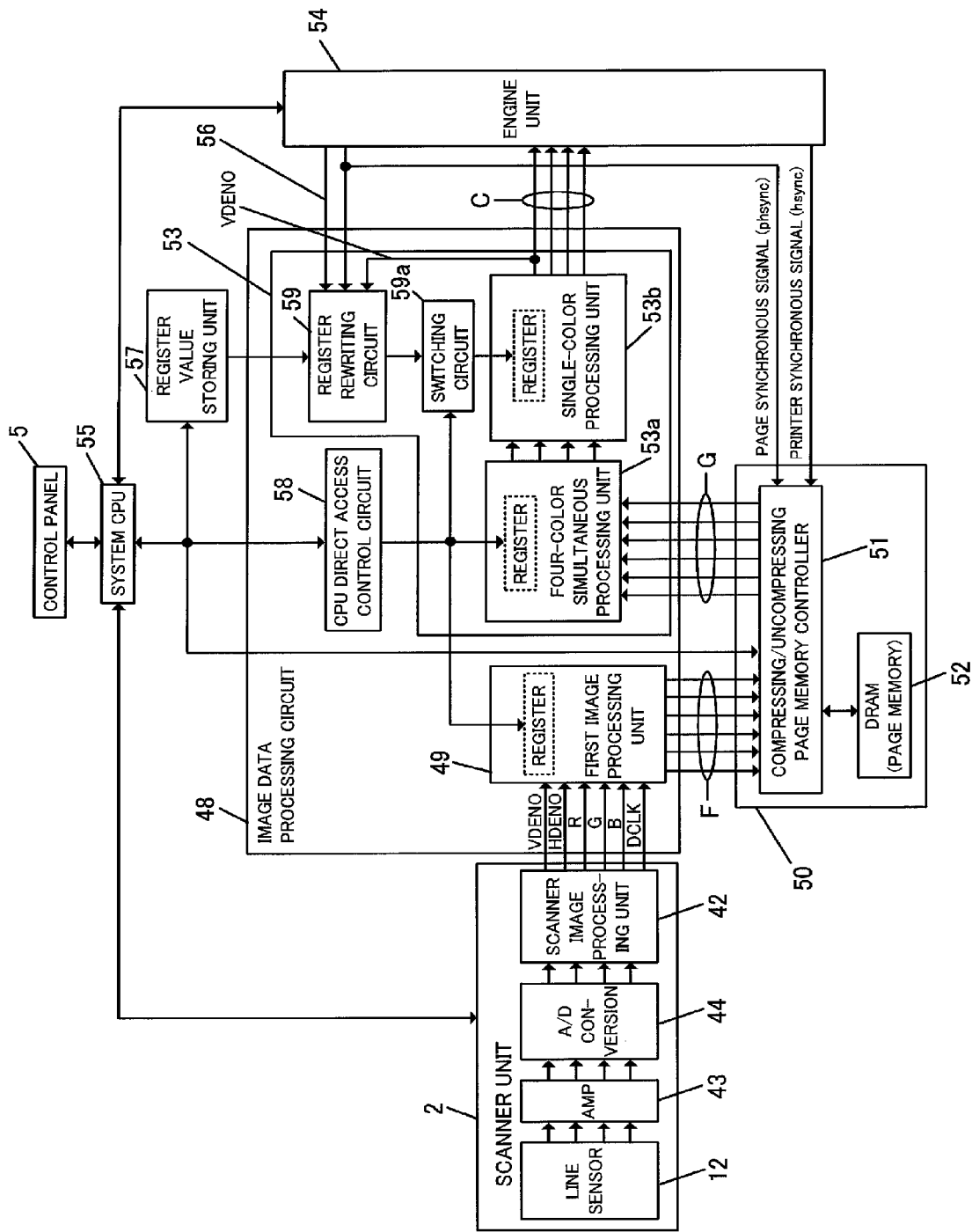
FIG. 2 is a block diagram of a first embodiment of an image processing circuit of the color image forming apparatus in FIG. 1.

FIG. 2 is a general block diagram for explaining an example of an image processing circuit 40 for generating the output image signal for processing one or both of the monochrome image signal or the RGB color image signals outputted from the line CCD sensor 12 to form an image by the image forming apparatus shown in FIG. 1. The scanner unit 2 includes the line CCD sensor 12, an amplifier (AMP) 43 for amplifying a signal from the line CCD sensor 12, an A/D converter 44 for converting the monochrome image signal and the RGB color image signals outputted from the amplifier into the digital signal respectively, and a scanner image processing unit 42. The scanner image processing unit 42 applies correction of misalignment of the reading position of the source document, correction of influence of chromatic aberration or the like to the monochrome image signal outputted from the A/D converter 44 and the RGB color image signals and outputs the monochrome image signal and the RGB color image signals.

The scanner unit 2 outputs the RGB color image signals, and also outputs a vertical scanning effective signal (VDEN0) and a horizontal scanning effective signal (HDEN0) that determines effective range with respect to the color image signals, and a clock signal (DCLK). The RGB color image signals, the vertical scanning effective signal (VDEN0), the horizontal scanning effective signal (HDEN0) and the clock signal DCLK outputted from the scanner unit 2 is sent to a first image processing unit 49 of an image data processing circuit 48.

The first image processing unit 49 applies predetermined processes such as filtering, density conversion, color conversion, and so on to the RGB color image signals, the vertical scanning effective signal (VDEN0), the horizontal scanning effective signal (HDEN0), and the clock signal DCLK outputted from the scanner unit 2 and sends the same to a page memory unit 50. The signal to be sent to the page memory unit 50 does not have to be necessarily the RGB color image signals, the vertical scanning effective signal (VDEN0), the horizontal scanning effective signal (HDEN0), and the clock signal DCLK, and may be the CMY signal, the Lab signal, and the CMYK signal.

The RGB color image signals, the vertical scanning effective signal (VDEN0), the horizontal scanning effective signal (HDEN0), the clock signal DCLK, the CMY signal, the Lab signal, and the CMYK signal to be sent to the page memory unit 50 are represented by reference sign F. The page memory 50 includes compressing/uncompressing page memory controller 51 and a page memory (DRAM) 52.

The compressing/uncompressing page memory controller 51 compresses the RGB color image signals, the vertical scanning effective signal (VDEN0), the horizontal scanning effective signal (HDEN0), and the clock signal DCLK sent from the first image processing unit 49 and stores the same in the page memory 52, and uncompresses the RGB color image signals, the vertical scanning effective signal (VDEN0), the horizontal scanning effective signal (HDEN0), and the clock signal DCLK and sends the same to a second image processing unit 53. The RGB color image signals, the vertical scanning effective signal (VDEN0), the horizontal scanning effective signal (HDEN0), and the clock signal DCLK to be sent to the second image processing unit 53 are represented by reference sign G.

The second image processing unit 53 applies predetermined processes such as gradation processing, color conversion and so on to the RGB color image signals, the vertical scanning effective signal (VDEN0), the horizontal scanning effective signal (HDEN0), and the clock signal DCLK outputted from the compressing/uncompressing page memory controller 51, and sends the same to an engine unit 54. The YMCK color image signals, the vertical scanning effective signal (VDEN0), the horizontal scanning effective signal (HDEN0), and the clock signal DCLK to be sent to the engine unit 54 is represented by reference sign C.

The engine unit 54 receives the YMCK color image signals, the vertical scanning effective signal (VDEN0), the horizontal scanning effective signal (HDEN0), and the clock signal DCLK outputted from the second image processing unit 53, and activates the image forming apparatus shown in FIG. 1 on the basis of these signals, and prints out the image on the paper P. At this time, the engine unit 54 outputs a printer synchronous signal hsync and a page synchronous signal phsync with respect to the compressing/uncompressing page memory controller 51.

The compressing/uncompressing page memory controller 51 reads image data from the page memory 52 according to the printer synchronous signal hsync and the page synchronous signal phsync and outputs the same to the second image processing unit 53. A control to generate the VDEN0 and HDEN0 signals and output the same synchronously with the image data is also done by the compressing/uncompressing memory controller 51.

In the color PPC (an image data processing circuit of the four-rotation machine), the second image processing unit 53 includes a function processing block 53a (four-color synchronous processing unit 53a) for processing the YMCK colors simultaneously, such as the color conversion and a function processing block 53b (single-color processing unit 53b) that processes only any one of single colors YMCK, such as the gradation processing. When the color source document is printed out by color PPC, for example, the printing process for single color is repeated four times such as Y→M→C→K, and hence the compressing/uncompressing page memory controller 51 reads the same data four times from the page memory 52 synchronously with the printer synchronous signal hsync and the page synchronous signal phsync from the engine unit 54.

In this case, the second image processing unit 53 includes a direct access control circuit 58 that sets the register directly from a normal system CPU 55, and a register rewriting circuit 59 that loads the contents of the register (single-color register) of the function processing block 53b (single-color processing unit 53b) from a register value storing unit 57 (storage unit; for example, ROM or RAM) provided outside the image data processing circuit 48 synchronously with a page synchronous signal phsync that is entered from the engine unit 54, a color information signal 56 that indicates the printing color, and the VDEN0 outputted from the second image processing unit 53. The register value storing unit 57 stores register values corresponding to the color to be processed.

Figure 3:
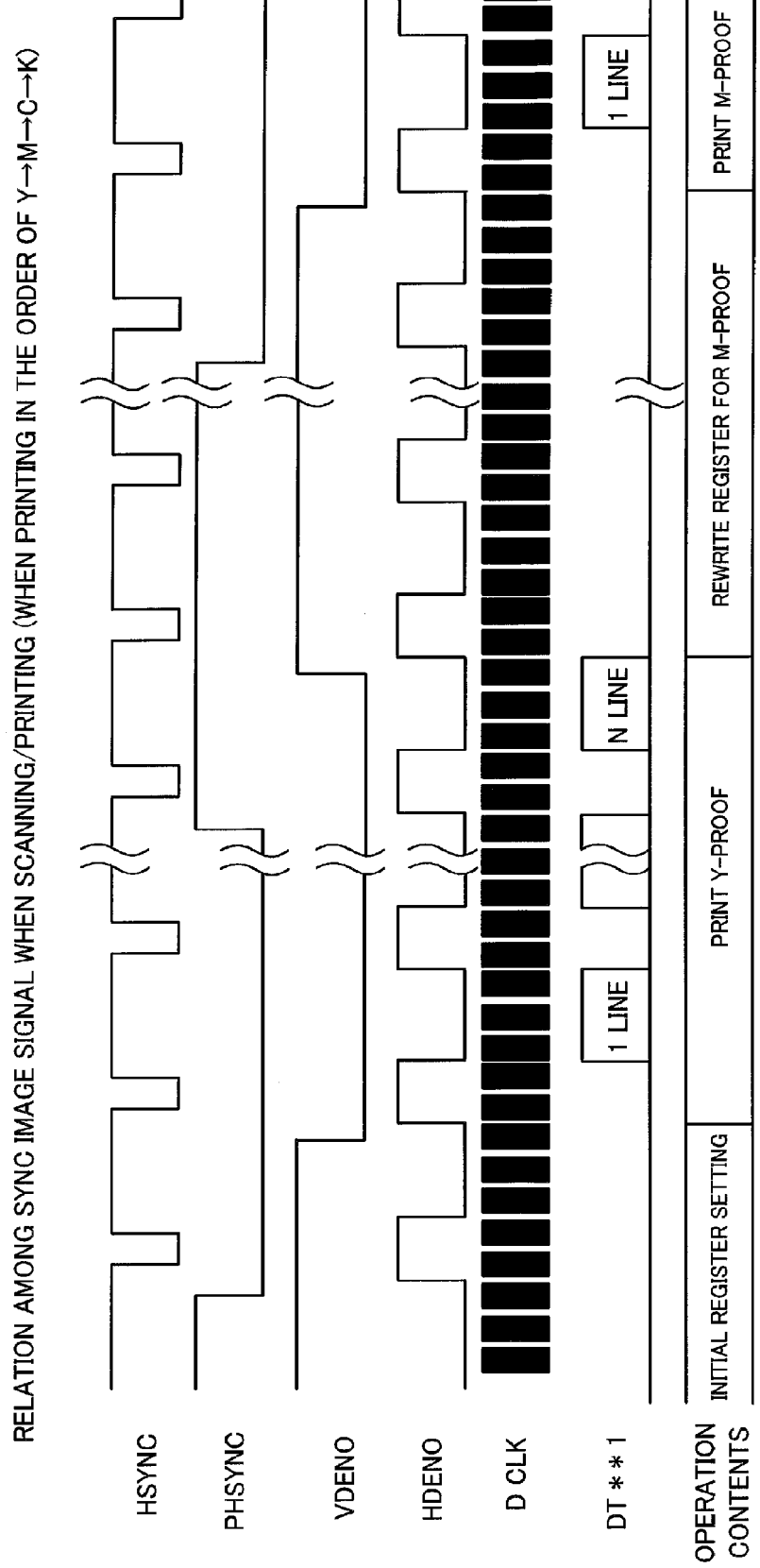
FIG. 3 is a time chart for explaining an operation of the image processing circuit shown in FIG. 2.

Switching whether the CPU 55 sets register value directly to the function processing block 53b via the direct access control circuit 58 or the register rewriting circuit 59 loads the register value from the register value storing unit 57, which is an external storage area, by the page synchronous signal phsync from the engine unit 54, the color information signal 56 that indicates the printing color, and VDEN0 outputted from the second image processing unit 53 without the intermediary of the system CPU 55 can be set by the system CPU 55 before starting printing operation (see FIG. 3).

FIG. 3 shows relation among the printer synchronous signal hsync and the page synchronous signal phsync, which are outputted from the engine unit 54, and the vertical scanning effective signal (VDEN0), the horizontal scanning effective signal (HDEN0), and the image data DT, which are outputted to the engine unit 54 at the time of printing operation with the color PPC. The operation of the scanner unit 2, the first and second image processing units 49, 53 that execute the image processing and the engine unit 54 are controlled by the CPU 55. The control panel 5 is connected to the CPU 55, and the control panel 5 includes the plurality of select switches for selecting a monochrome image reading mode, a color image reading mode, start copying and so on arranged thereon.

Subsequently, the operation of the apparatus configured as shown above will be described. When the monochrome source document is arranged at a predetermined position on the document table glass 6 and the select switch of copy start button and the monochrome source document reading mode are operated on the control panel 5, illumination light of a predetermined light intensity is irradiated from the light source 7. By movement of the first and second carriages 13, 14 along the document table glass 6 at a predetermined speed according to the copying magnification, image information of an object set on the document table glass 6 is illuminated by illumination light from the light source 7 in sequence. Accordingly, reflected light containing image information from the object as contrast of light is generated. The reflected light is referred to as image light.

The image light is reflected by the mirror 8 fixed on the first carriage 13 toward the second carriage 14, and then reflected again by the mirrors 9, 10 of the second carriage 14, thereby entering into the reducing lens 11. The image light entered into the reducing lens 11 is formed into an image on a light receiving unit 12a of the line CCD sensor 12. The image light formed into the image on the line CCD sensor 12 is photoelectrically converted by, for example, four line sensors R, G, B, BK corresponding to R, G, B, BK images which are complementary colors of the C, M and Y, respectively, and outputted to the image processing unit 40 (see FIG. 1).

The monochrome image signal outputted from the BK line sensor of the line CCD sensor 12 is entered into the amplifier 43 and is amplified into a predetermined level. The monochrome image signal amplified by the amplifier 43 is converted into a digital signal by the A/D converter 44, and is entered into the scanner image processing unit 42. The scanner image processing unit 42 outputs the monochrome image signal outputted from the A/D converter 44 after having corrected misalignment in reading position of the source document and corrected influence of the chromatic aberration, and outputs the vertical scanning effective signal (VDEN0) and the horizontal scanning effective signal (HDEN0) that determine the effective range of the monochrome image signal and the clock signal (DCLK).

The first image processing unit 49 applies predetermined processes to the monochrome image signal, the vertical scanning effective signal (VDEN0), the horizontal scanning effective signal (HDEN0), and the clock signal (DCLK) outputted from the scanner unit 2 and sends the results to the page memory unit 50. The first image processing unit 49 may send the CMY signal or the Lab signal to the page memory unit 50. The compressing/uncompressing page memory controller 51 in the page memory unit 50 compresses the monochrome image signal, the vertical scanning effective signal (VDEN0), the horizontal scanning effective signal (HDEN0) and the clock signal DCLK and stores the results in the page memory 52, reads the image data from the page memory 52 according to the printer synchronous signal hsync and the page synchronous signal phsync, uncompresses the monochrome image signal, the vertical scanning effective signal (VDEN0), the horizontal scanning effective signal (HDEN0) and the clock signal (DCLK) and sends the results to the second image processing unit 53.

The compressing/uncompressing page memory controller 51 also executes control to generate the VDEN0 and HDEN0 signals and outputs the same synchronously with the image data. The second image processing unit 53 applies predetermined process to the monochrome image signal, the vertical scanning effective signal (VDEN0), the horizontal scanning effective signal (HDEN0) outputted from the compressing/uncompressing page memory controller 51 and sends the results to the engine unit 54.

The engine unit 54 receives the monochrome image signal, the vertical scanning effective signal (VDEN0), horizontal scanning effective signal (HDEN0) and the clock signal (DCLK) outputted from the second image processing unit 53, operates the image forming apparatus shown in FIG. 1 and prints out an image on the paper P on the basis of these signals. At this time, the engine unit 54 outputs the printer synchronous signal hsync, the page synchronous signal phsync and the color information signal 56 that represents the printing color to the compressing/uncompressing page memory controller 51. The printer synchronous signal hsync is generated from a beam detect signal BD outputted synchronously with one rotation of a polygon motor, and the page synchronous signal phsync is generated by the engine unit 54 according to an image forming timing with respect to the paper.

Subsequently, the operation to transfer the monochrome image to the paper P will be described. The revolver rotates clockwise (shown by an arrow in the drawing), and the black developer 22BK opposes the drum surface 18a. The belt cleaner 25 rotates counterclockwise about the shaft 25a and is separated from the intermediate transfer belt 23, and the secondary transfer roller 26 moves apart from the paper carrier path 32 (rightward in the drawing) and is separated from the intermediate transfer belt 23. The exposure device 20 scans the drum surface 18a with a laser beam on the basis of the monochrome image signal, and an electrostatic latent image for black color is formed on the drum surface 18a. Subsequently, black developer is supplied to the electrostatic latent image on the drum surface 18a via the black developer 22BK, and hence a black developer image is formed on the drum surface 18a.

The black developer image on the drum surface 18a formed in this manner is moved by the rotation of the photoreceptor drum 18, and reaches a primary transfer point that is in contact with the intermediate transfer belt 23. At the primary transfer point, a bias of an opposite polarity from a potential of the black developer is applied via a primary transfer roller, and the black developer image on the drum surface 18a is transferred to the intermediate transfer belt 23. The black developer which has not been transferred and remained thereon is removed by the drum cleaner 24a from the drum surface 18a which has passed the primary transfer point and, simultaneously, the remaining electric charge is removed. Then, the revolver of the black developer 22BK rotates to a home position that does not oppose to the drum surface 18a.

When the black developer image is transferred onto the intermediate transfer belt 23 in this manner, the secondary transfer roller 26 moves leftward in the drawing and comes into contact with the intermediate transfer belt 23, and comes into contact with the intermediate transfer belt 23 of the belt cleaner 25. In this state, the black developer image on the intermediate transfer belt 23 moves by the rotation of the intermediate transfer belt 23, and passes through a secondary transfer point with respect to the secondary transfer roller 26. At this time, the paper P taken out from each cassettes 27, 28 by the pickup roller 29 is carried upward in the vertical carrier path 32 by the carrier roller pair 33, is aligned once by the aligning roller 35, and is fed into the secondary transfer area at a predetermined timing.

Then, a bias opposite from the potential of the black developer is applied via the secondary transfer roller 26, and the black developer on the intermediate transfer belt 23 is transferred to the paper P. Then, the paper P passes through the fixing device 36 to be heated and pressurized, whereby the black developer image is fixed on the paper P, and hence a monochrome image is formed. The paper P on which the monochrome image is formed is discharged onto a discharge tray 61 via a discharge roller 60 provided on the downstream side of the fixing device 36.

On the other hand, when reading the color source document, the monochrome image signal outputted from the respective line sensors of BK, R, G and B of the line CCD sensor 12, and the RGB color image signals are entered into the amplifier 43 respectively and are amplified to predetermined levels. The monochrome image signal amplified by the amplifier 43 and the RGB color image signals are converted into the digital signal by the A/D converter 44 respectively and entered into the scanner image processing unit 42. The scanner image processing unit 42 corrects the misalignment in the source document reading position and influence of the chromatic aberration of the monochrome image signal and the RGB color image signals outputted from the A/D converter 44, and outputs the result, and outputs the vertical scanning effective signal (VDEN0), the horizontal scanning effective signal (HDEN0) that determine the effective range of the monochrome image signal and the clock signal (DCLK).

The first image processing unit 49 of the image data processing circuit 48 applies a predetermined process to the monochrome image signal, the RGB color image signals, the vertical scanning effective signal (VDEN0), the main scanning effective signal (HDEN0) and the clock signal (DCLK) outputted from the scanner unit 2, and sends the same to the page memory unit 50. The first image processing unit 49 may send the CMY signal or the Lab signal to the page memory unit 50.

The compressing/uncompressing page memory controller 51 in the page memory unit 50, described above, compresses the monochrome image signal, the RGB color image signals, the vertical scanning effective signal (VDEN0), the horizontal scanning effective signal (HDEN0) and the clock signal (DCLK) sent from the first image processing unit 49, stores the same in the page memory 52, reads the image data from the page memory 52 according to the printer synchronous signal hsync and the page synchronous signal phsync, and uncompresses the monochrome image signal, the vertical scanning effective signal (VDEN0), the horizontal scanning effective signal (HDEN0) and the clock signal (DCLK), and outputs the same to the second image processing unit 53.

The compressing/uncompressing page memory controller 51 also executes a process to generate the VDEN0, HDEN0 signals and outputs the same synchronously with the image data. When printing out the color source document, for example, since the single-color printing process is executed four times repeatedly such as Y→M→C→K by the four-rotation machine, the compressing/uncompressing page memory controller 51 reads the same data four times from the page memory 52 synchronously with the synchronous signal hsync and the page synchronous signal phsync from the engine unit 54.

At this time, the system CPU 55 sets register values required for the image processing in each printing color process in the register value storing unit 57 provided outside the second image processing unit 53 (image data processing circuit 48 in the drawing) in advance. However, the register value of the first printing color process is set to the register in the second image processing unit 53. As regards the operation from the second printing color on, the second image processing unit 53 rewrites the register value of the single-color register arranged in the function processing block 53b (single-color processing unit 53b) with the register value in the register value storing unit 57 provided outside the image data processing circuit 48 synchronously with the page synchronous signal phsync inputted from the engine unit 54, the color information signal 56 that represents the printing color and the VDEN0 which indicates that the image processing on the page-to-page basis outputted from the second image processing unit 53 is ended.

The function processing block 53b of the second image processing unit 53 executes the image processing according to the contents of the register which have been rewritten between the pages in the respective printing colors, and outputs the image signal, the vertical scanning effective signal (VDEN0), the horizontal scanning effective signal (HDEN0) and the clock signal (DCLK) in any printing colors of YMCK to the engine unit 54. The engine unit 54 receives the monochrome image signal, the color image signal, the vertical scanning effective signal (VDEN0), the horizontal scanning effective signal (HDEN0) and the clock signal (DCLK) outputted form the second image processing unit 53, operates the color PPC (four-rotation engine) shown in FIG. 1 to print out the same on the paper P on the basis of these signals. At this time, the engine unit 54 outputs the printer synchronous signal hsync and the page synchronous signal phsync to the compressing/uncompressing page memory controller 51.

Subsequently, the operation to transfer the color image to the paper P will be described. The revolver rotates clockwise and the yellow developing machine 22Y opposes the drum surface 18a. The belt cleaner 25 rotates counterclockwise about an axis 25a and moves apart from the intermediate transfer belt 23, and the secondary transfer roller 26 moves apart from the paper carrier path 32 (rightward in the drawing) and is separated from the intermediate transfer belt 23. The exposure device 20 scans the drum surface 18a with a laser beam on the basis of the yellow color image signal, and an electrostatic latent image for yellow is formed on the drum surface 18a. Subsequently, yellow developer is supplied to the electrostatic latent image on the drum surface 18a via the yellow developing machine 22Y, and a yellow developer image is formed on the drum surface 18a. The yellow developer image on the drum surface 18a formed in this manner is moved by the rotation of the photoreceptor drum 18, and reaches the primary transfer point which is in contact with the intermediate transfer belt 23. At the primary transfer point, a bias of an opposite polarity from the potential of the yellow developer is provided via the primary transfer roller, and the yellow developer image on the drum surface 18a is transferred to the intermediate transfer belt 23. The yellow developer which has not been transferred and hence remained on the drum surface 18a is removed by the drum cleaner 24a from the drum surface 18a which has passed through the primary transfer point and, simultaneously, the residual electric charge is also removed. The drum surface 18a is uniformly charged by the charging device 19 for the next formation of a magenta electrostatic latent image, the revolver 22 is rotated, and the magenta developing machine 22M opposes the drum surface 18a. In this state, a series of processes, that is, exposure→develop→transfer to the intermediate transfer belt 23 are executed as in the case of yellow described above, and the magenta developer image is transferred to the intermediate transfer belt 23 so as to be overlapped with the yellow developer image. After having transferred the magenta developer image in this manner, a cyan developer image and a black developer image are also transferred so as to be overlapped therewith. Then, the revolver is rotated to a home position where none of the developing machines 22Y, 22M, 22C and 22BK opposes the drum surface 18a.

When the developer images of all the colors are overlapped with each other on the intermediate transfer belt 23 as described above, the secondary transfer roller 26 moves leftward in the drawing and comes into contact with the intermediate transfer belt 23, so as to come into contact with the intermediate transfer belt 23 of the belt cleaner 25. In this state, the developer images of all the colors overlapped on the intermediate transfer belt 23 move by the rotation of the intermediate transfer belt 23, and pass through the secondary transfer point with respect to the secondary transfer roller 26. At this time, the paper P taken out from each cassette 27, 28 by the pickup roller 29 is carried upward in the vertical carrier path 32 by the carrier roller pair 33, aligned once by the aligning roller 35, and then fed to the secondary transfer area at a predetermined timing. Then, the bias opposite from the potential of the developer images of the respective colors is applied via the secondary transfer roller 26, and the developers of the respective colors on the intermediate transfer belt 23 are transferred onto the paper P. The paper P on which the developer images of the respective colors are transferred together then passes through the fixing device 36 to be heated and pressed, so that the developer images of the respective colors are fixed on the paper P and a color image is formed. The paper P on which the color image is formed in this manner is discharged to the discharge tray 61 via the discharge roller 60 provided on the downstream side of the fixing device 36.

When the color image is printed out by the color PPC (four-rotation engine) in this manner, the image data processing circuit can be configured as in the case of the tandem engine by arranging the register only for one color in the function processing block (single-color processing unit) 53b of the second image processing unit 53, and causing the register rewriting circuit 59 to load and renew the register value from the register value storing unit 57 provided outside the second image processing unit 53 (image data processing circuit 48 in FIG. 2) via DMA synchronously with the page synchronous signal phsync from the engine unit, the color information signal 56 indicating the printing color and VDEN0 outputted from the second image processing unit 53. Therefore, the image data processing circuit can be shared by both engines. In other words, the problem is solved by providing the register value storing unit outside the image data processing circuit of the quadruple tandem machine, and providing the direct access circuit, the register rewriting circuit and the switching circuit 59a in the image data processing circuit so that the writing route of the register value for the single-color register can be selected.

When being used for the four-rotation machine, the rewriting of the register can be achieved without the intermediary of the CPU, and hence the speed of the processing between the printing colors (between pages) can be increased. In the case of this circuit, the image data processing circuit 48 may be configured as an LSI, or only the second image processing unit 53 may be configured as an LSI.

Second Embodiment

Subsequently, referring now to FIG. 4, a second embodiment of the invention will be described. This embodiment is a modification of the first embodiment shown above, and is substantially the same as the first embodiment except for the points described below. In the second embodiment, a signal as a trigger for rewriting of the register between the printing colors is a switching signal provided from the CPU 55 instead of the page synchronous signal phsync and the color information signal 56 indicating the printing color used in the first embodiment.

Third Embodiment

Figure 4:
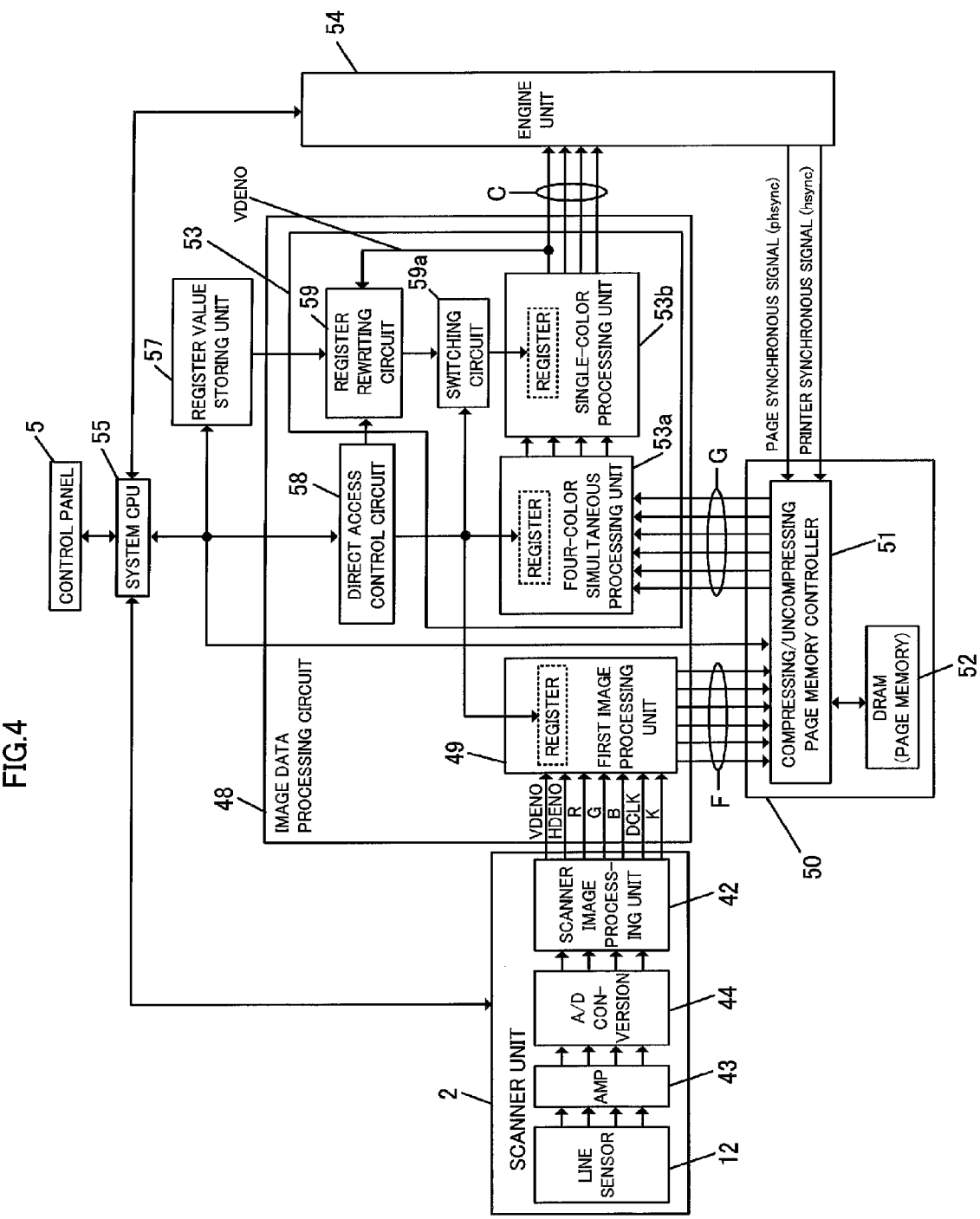
FIG. 4 is a block diagram showing a second embodiment of the image processing circuit of the color image forming apparatus in FIG. 1.
Figure 5:
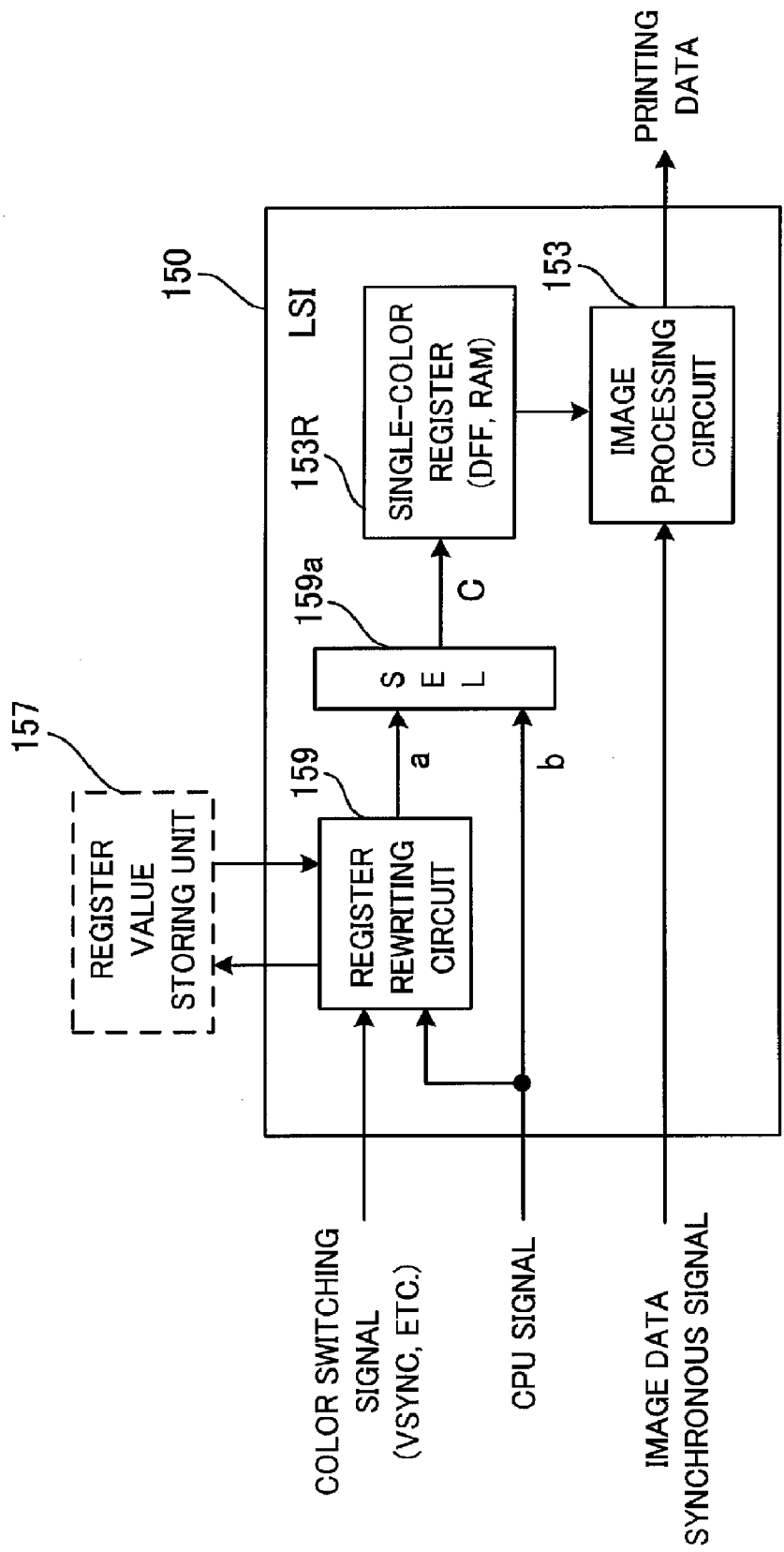
FIG. 5 is a block diagram for explaining a large scale integration of the image data processing circuit in FIG. 4.
Figure 6:
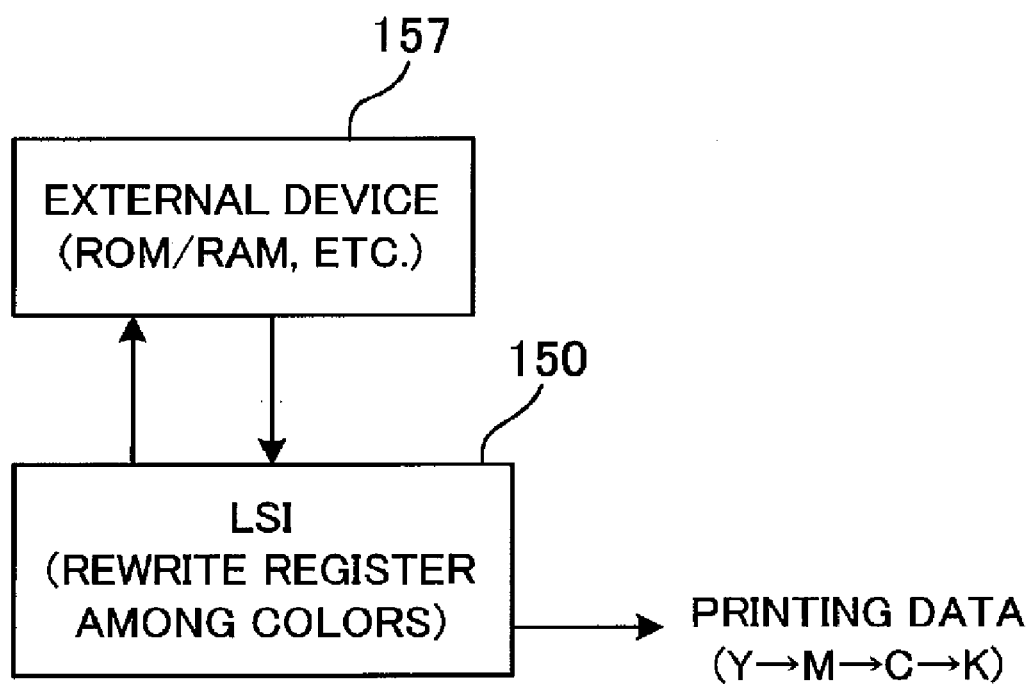
FIG. 6 is a block diagram explaining a case in which the LSI formed as shown in FIG. 5 is used in the four-rotation machine.
Figure 7:
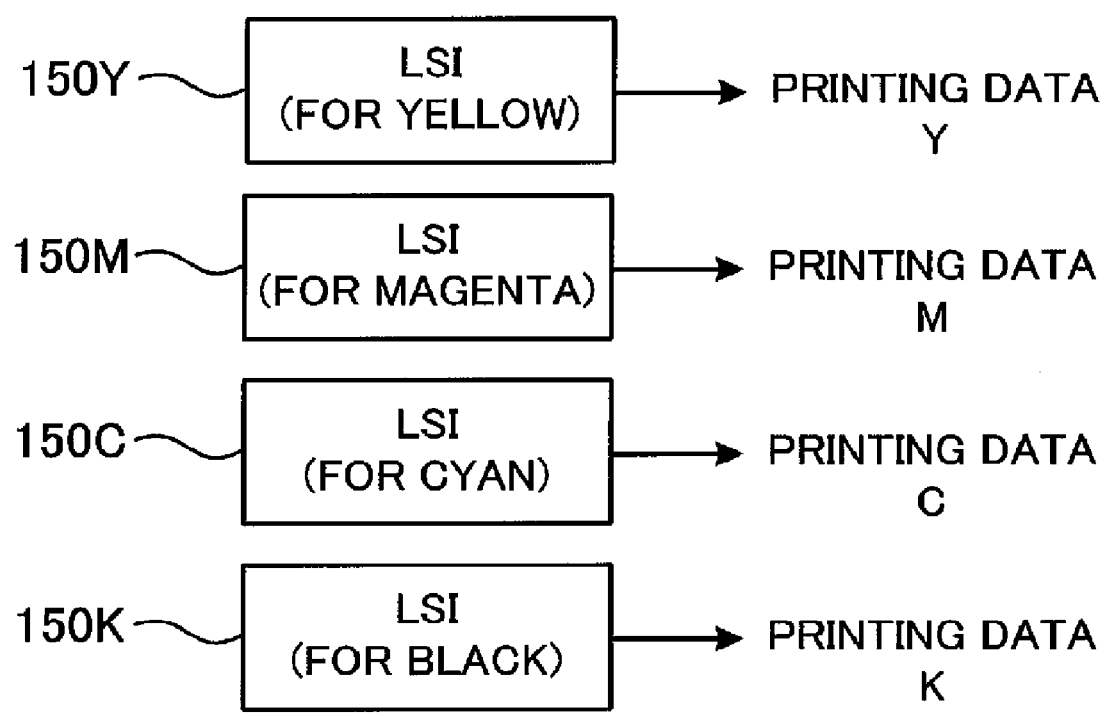
FIG. 7 is a block diagram for explaining a case in which the LSI formed as shown in FIG. 5 is used in the quadruple tandem machine.

Referring now to FIG. 5 to FIG. 7, an example in which the image data processing circuit shown in FIG. 4 is configured into the LSI for use will be described. The LSI 150 shown in FIG. 5 includes an image processing circuit 153, a single-color register 153R, a switching circuit 159a (SEL), and a register rewriting control circuit 159. The image data processing circuit 153 has a function combining a function as the first image processing unit 49 and the four-color simultaneous processing unit 53a in FIG. 4 and a function of the single-color processing unit 53b except for the register.

When this LSI is used in the color PPC (four-rotation engine) as shown in FIG. 4, a register value storing unit 157 (for example, ROM or RAM) is connected to the register rewriting circuit 159. In this case, at the time of initial register setting before the printing operation is started, the CPU 55 sets a first color to a single-color register 153R, for example, a register value of Y-color through the direct access control circuit 58 and a route b-c of the SEL 159a and stores the register values for three colors of MCK in the register value storing unit 157.

After having started the printing operation, when the output of the printing data of a first color is completed, a color switching signal (for example, the color code signal or the VSYNC signal) from the outside is provided to the register rewriting circuit 159. The register rewriting circuit 159 accesses to an area in the register value storing unit 157 in which the register value relating to the next printing color is stored. In this case, the register rewriting circuit 159 gives an instruction about an address corresponding to the target area automatically and rewrites the register value of the single-color register 153R through the DMA transfer via a route a-c of the SEL 159a.

Since the DMA is used as described above, the problems in the related art such that it requires too much time if the register value of the single-color register 153R by the CPU 55 in sequence, and rewriting of the register value within the data non-effective period between colors is difficult is solved. In other words, since the register value of the single-color register 153R is rewritten by the register value from the register value storage unit 157 directly without the intermediary of the CPU 55, rewriting in a short time is enabled. Therefore, in the case in which this LSI is used in the color PPC (four-rotation engine), the image data processing can be performed without using a plurality of single-color registers 153R as in the related art.

On the other hand, when the LSI is used for the quadruple tandem machine, the CPU 55 rewrites the register value of the single-color register 153R as in the same manner as in the related art via the route b-c of the SEL 159a. In this case, the register storing unit 157 is not used. Then, as shown in FIG. 7, by arranging the LSI shown in FIG. 5 in the processing stages of the respective colors as LSI 150Y, 150M, 150C, 150K, the image data processing can be executed in the processing stages of the respective colors Y, M, C, K as in the related art. Needless to say, the large scale integration can also be applied to the case shown in FIG. 2 in the same manner.

As understood from the embodiment, according to the invention, the image data processing circuit can be shared between the four-rotation engine and the quadruple tandem without causing deterioration in performance of the four-rotation engine, and in the case of the four-rotation engine, it is not necessary to provide the registers for four colors which are not used simultaneously. Therefore, reduction of the cost at the time of integration is achieved.

Although the invention has been described in detail according to the specific embodiments, those skilled in the art will understand that various changes and modifications may be made without departing the spirit and the scope of the invention.

What is claimed is:

1. An image forming apparatus in which a first image processing unit out of first and second image processing units provided in an image data processing circuit executes a first image processing for an image read by a scanner unit, stores an image signal in a page memory, the second image processing unit reads the image signal from the page memory according to a synchronous signal generated in an engine unit to execute a second image processing, and the engine unit forms the image on the basis of the results therefrom, comprising:

a register value storing unit provided outside the image data processing circuit for storing a register value required for the image processing;

a single-color register arranged in the second image processing unit;

a direct access control circuit arranged in the image data processing circuit for enabling the CPU to rewrite the register value for the single-color register in the second image processing unit;

a register rewriting circuit arranged in the image data processing circuit for enabling rewriting of the register value for the single-color register in the second image processing unit by the register value from the register value storing unit;

a switching circuit arranged in the image data processing circuit for allowing one of a CPU that goes through a direct access control circuit and a register rewriting circuit to access the single-color register in the second image processing unit for rewriting the register value as needed; and wherein the image data processing circuit is configured as an integrated circuit;

wherein the timing to rewrite the register value of the single-color register in the second image processing unit by the register value from the register value storing unit provided outside the second image processing unit is determined on the basis of a page synchronous signal supplied from the engine unit, a color information signal indicating a printing color, and a vertical scanning effective signal outputted from the second image processing unit.

2. The image forming apparatus according to claim 1, wherein when rewriting the register value as needed by allowing one of the CPU that goes through the direct access control circuit and the register rewriting circuit to access a single-color register in the second image processing unit, the CPU rewrites the register value of the first color and the register rewriting circuit rewrites the register values of the colors from the second color on.

3. The image forming apparatus according to claim 1, wherein the timing of rewriting the register value of the single-color register in the second image processing unit by the register value from the register value storing unit provided outside the second image processing unit is determined by the CPU that gives printing instruction to the page memory and the engine unit.

* * * * *